United States Patent
Carlos

(10) Patent No.: US 12,152,622 B2
(45) Date of Patent: Nov. 26, 2024

(54) FASTENER FOR PREVENTING FREE SPINNING ACTION DURING THE FASTENING PROCESS

(71) Applicant: Emmanuel Carlos, El Cajon, CA (US)

(72) Inventor: Emmanuel Carlos, El Cajon, CA (US)

( * ) Notice: Subject to any disclaimer, the term of this patent is extended or adjusted under 35 U.S.C. 154(b) by 475 days.

(21) Appl. No.: 16/743,655

(22) Filed: Jan. 15, 2020

(65) Prior Publication Data

US 2020/0224702 A1    Jul. 16, 2020

Related U.S. Application Data

(60) Provisional application No. 62/792,764, filed on Jan. 15, 2019.

(51) Int. Cl.
   *F16B 39/30*   (2006.01)
   *F16B 25/00*   (2006.01)

(52) U.S. Cl.
   CPC ...... *F16B 25/0057* (2013.01); *F16B 25/0031* (2013.01); *F16B 25/0073* (2013.01)

(58) Field of Classification Search
   CPC .............. F16B 25/0031; F16B 25/0073; F16B 25/0057
   USPC ......................................... 411/311, 411, 412
   See application file for complete search history.

(56) References Cited

U.S. PATENT DOCUMENTS

| | | | | |
|---|---|---|---|---|
| 2,019,049 A * | 10/1935 | Hoke | ...................... | F16B 4/004 411/968 |
| 2,024,069 A * | 12/1935 | Sharp | ...................... | F16B 4/004 411/425 |
| 3,124,031 A * | 3/1964 | Knohl | .................. | F16B 5/0275 411/932 |
| 4,018,132 A * | 4/1977 | Abe | ...................... | F16B 5/0275 470/57 |
| 6,125,526 A * | 10/2000 | Wierzchon | ............ | F16B 5/0275 411/335 |
| 7,172,380 B2 * | 2/2007 | Lees | ........................ | F16B 39/16 411/222 |
| 2005/0207869 A1 * | 9/2005 | Haas | ..................... | F16B 5/0275 411/412 |
| 2009/0003969 A1 * | 1/2009 | Gattone | .................. | F16B 21/08 411/413 |
| 2009/0010734 A1 * | 1/2009 | Lin | ........................ | F16B 35/041 411/413 |

(Continued)

*Primary Examiner* — Gary W Estremsky
(74) *Attorney, Agent, or Firm* — The Inventor's Friend Patent Law Firm, P.L.L.C.; Nathaniel A. Wickliffe

(57) ABSTRACT

Disclosed herein is a fastener for preventing free spinning action during the fastening process, in accordance with some embodiments. Accordingly, the fastener may include a fastener head and a fastener body. Further, the fastener head may include a top head surface and a bottom head surface. Further, the bottom head surface may be characterized by a bottom surface area. Further, the fastener body attached to the fastener head. Further, a first body end of the fastener body may be attached to the bottom head surface. Further, a first end cross-sectional area of the first body end may be less than the bottom surface area. Further, the fastener body may include a first body portion and a second body portion. Further, the first body portion is proximal to the first body end. Further, the second body portion proximal to a second body end of the fastener body.

18 Claims, 15 Drawing Sheets

(56) References Cited

U.S. PATENT DOCUMENTS

| | | | |
|---|---|---|---|
| 2011/0217145 A1* | 9/2011 | Kochheiser | F16B 25/106 |
| | | | 29/525.11 |
| 2012/0048696 A1* | 3/2012 | Liebetruth | H01H 3/022 |
| | | | 200/338 |
| 2016/0186794 A1* | 6/2016 | Belinda | F16B 25/0015 |
| | | | 411/387.1 |
| 2019/0219091 A1* | 7/2019 | Lin | F16B 25/0084 |

* cited by examiner

FASTENER FOR PREVENTING FREE SPINNING ACTION DURING THE FASTENING PROCESS

The current application claims a priority to the U.S. Provisional Patent application Ser. No. 62/729,764 filed on Jan. 15, 2019.

FIELD OF THE INVENTION

Generally, the present disclosure relates to the field of miscellaneous hardware. More specifically, the present disclosure relates to a fastener for preventing free spinning action during the fastening process.

BACKGROUND OF THE INVENTION

Currently, a carriage bolt is used to fasten metal plates to wooden beams with the square section of the bolt fitting through a square cut out in the metal. It can also be used through drilled holes in the wood or metal, with the square section providing enough grip to prevent any rotation. This design allows the user to work and install from a single side with the use of one tool such as a wrench. However, sometimes the bolt does not hold well enough causing the bolt to rotate or slip out. Current carriage bolt designs are primarily identified by a shallow domed head with the portion directly below the head formed into a square section. The current bolt designs require additional assistance to hold or keep the bolts from falling or free spinning while attempting to apply the nut.

Further, a hex head bolt or bolts in general have similar issues during assembly. Bolts are used to fasten many types of material like metal, wood and plastics (composites). Current bolt designs are primarily identified by various head designs with a machined or formed helical thread. These designs also require additional assistance to hold or keep the bolts from falling or free spinning while attempting to apply the nut.

Therefore, there is a need for improved fastener for preventing free spinning action during the fastening process that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a fastener for preventing free spinning action during the fastening process, in accordance with some embodiments. Accordingly, the fastener may include a fastener head and a fastener body. Further, the fastener head may include a top head surface and a bottom head surface. Further, the bottom head surface may be characterized by a bottom surface area. Further, the fastener body attached to the fastener head. Further, a first body end of the fastener body may be attached to the bottom head surface. Further, a first end cross-sectional area of the first body end may be less than the bottom surface area. Further, the fastener body may include a first body portion and a second body portion. Further, the first body portion is proximal to the first body end. Further, the first body portion may include at least one primary helical thread. Further, the at least one primary helical thread may be associated with a primary handedness. Further, the second body portion proximal to a second body end of the fastener body. Further, the second body portion may include at least one secondary helical thread. Further, the at least one secondary helical thread may be associated with a second handedness. Further, the secondary handedness may be reverse of the primary handedness.

Disclosed herein is a fastener for preventing free spinning action during the fastening process, in accordance with some embodiments. Accordingly, the fastener may include a fastener head and a fastener body. Further, the fastener head may include a top head surface and a bottom head surface. Further, the fastener head may include at least one cavity disposed on the top head surface. Further, the at least one cavity configured for receiving an external member. Further, the at least one cavity facilitates translation of at least one action from the external member to the fastener. Further, the bottom head surface may be characterized by a bottom surface area. Further, the fastener body attached to the fastener head. Further, a first body end of the fastener body may be attached to the bottom head surface. Further, a first end cross-sectional area of the first body end may be less than the bottom surface area. Further, the fastener body may include a first body portion and a second body portion. Further, the first body portion is proximal to the first body end. Further, the first body portion may include at least one primary helical thread. Further, the at least one primary helical thread may be associated with a primary handedness. Further, the second body portion proximal to a second body end of the fastener body. Further, the second body portion may include at least one secondary helical thread. Further, the at least one secondary helical thread may be associated with a second handedness. Further, the secondary handedness may be reverse of the primary handedness.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
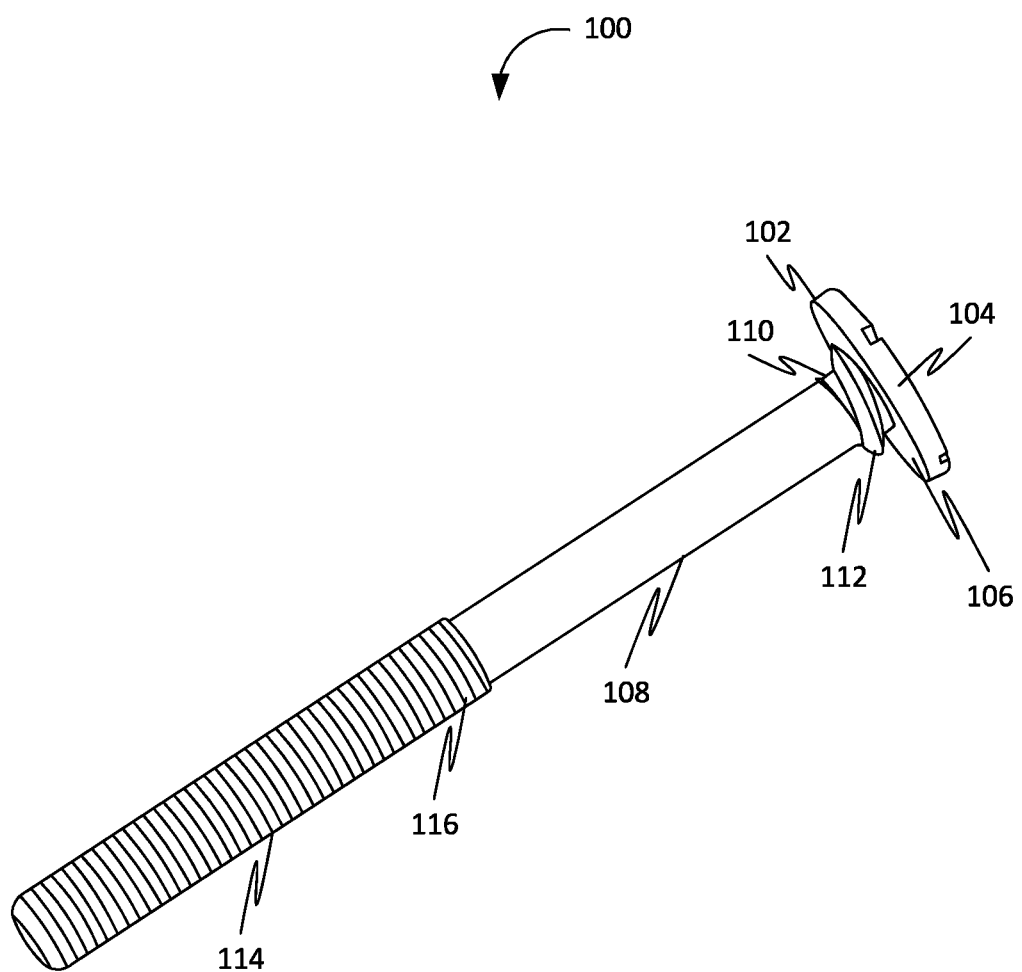
FIG. 1 is a fastener for preventing free spinning action during the fastening process, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of fastener for preventing free spinning action during the fastening process, embodiments of the present disclosure are not limited to use only in this context.

Overview:

The present disclosure describes a fastener for preventing free spinning action during the fastening process. Further, the fastener may include a turnlock bolt. Further, the turnlock bolt may prevent free spinning action of a standard bolt. Further, the spinning action will be prevented by a tapered helix section found immediately below the head of the turnlock bolt design. The function is to insert the bolt and turn in a counter clock motion until the bolt locks in place by driving the turnlock bolt until it bottoms out onto the object. This procedure will allow the user to lock the turnlock bolt in place and not have to hold it in position and allows the user to have both hands free after it is applied. Once the turnlock bolt is properly installed in place, the bolt will no longer spin freely, slip or fall out of the drilled or punched hole, even while turned upside down.

When the turnlock bolt has been installed, the nut can be applied without needing another tool or hand to keep the bolt from spinning. As the nut is turned clockwise to tighten, the turnlock bolt reverse helix below the head of the bolt will also tighten.

Further, the tapered helix design begins with a given cross-section under the bolt head that gradually tapers into a smaller one with a cut out similar to the reverse thread of a fastener. This feature grips into any material such as wood, but has similar applications with other materials, such as sheet metal or composites. The large thread cutout allows the bolt to turn and lock into cutouts in sheet metal. This design provides the same result as a conventional carriage bolt but expands its potential uses and applications.

Further, the disclosed fastener may include a bolt design that uses a tapered helix or reverse thread section found under the bolt head which can be manufactured in either standard or metric bolt sizes and geometries. The design allows the integrated helix feature to engage and lock the bolt to different materials allowing the user to work and install from a single side without holding the bolt once it is locked in place. Further, the disclosed fastener may be used in industrial, commercial, construction and home life industries.

FIG. 1 is a fastener 100 for preventing free spinning action during the fastening process, in accordance with some embodiments. Accordingly, the fastener 100 may include a fastener head 102 and a fastener body 108.

Further, the fastener head 102 may include a top head surface 104 and a bottom head surface 106. Further, the bottom head surface 106 may be characterized by a bottom surface area.

Further, the fastener body 108 attached to the fastener head 102. Further, a first body end of the fastener body 108 may be attached to the bottom head surface 106. Further, a first end cross-sectional area of the first body end may be less than the bottom surface area. Further, the fastener body 108 may include a first body portion 110 and a second body portion 114. Further, the first body portion 110 is proximal to the first body end. Further, the first body portion 110 may include at least one primary helical thread 112. Further, the at least one primary helical thread 112 may be associated with a primary handedness. Further, the second body portion 114 proximal to a second body end of the fastener body 108. Further, the second body portion 114 may include at least one secondary helical thread 116. Further, the at least one secondary helical thread 116 may be associated with a second handedness. Further, the secondary handedness may be reverse of the primary handedness.

Figure 2:
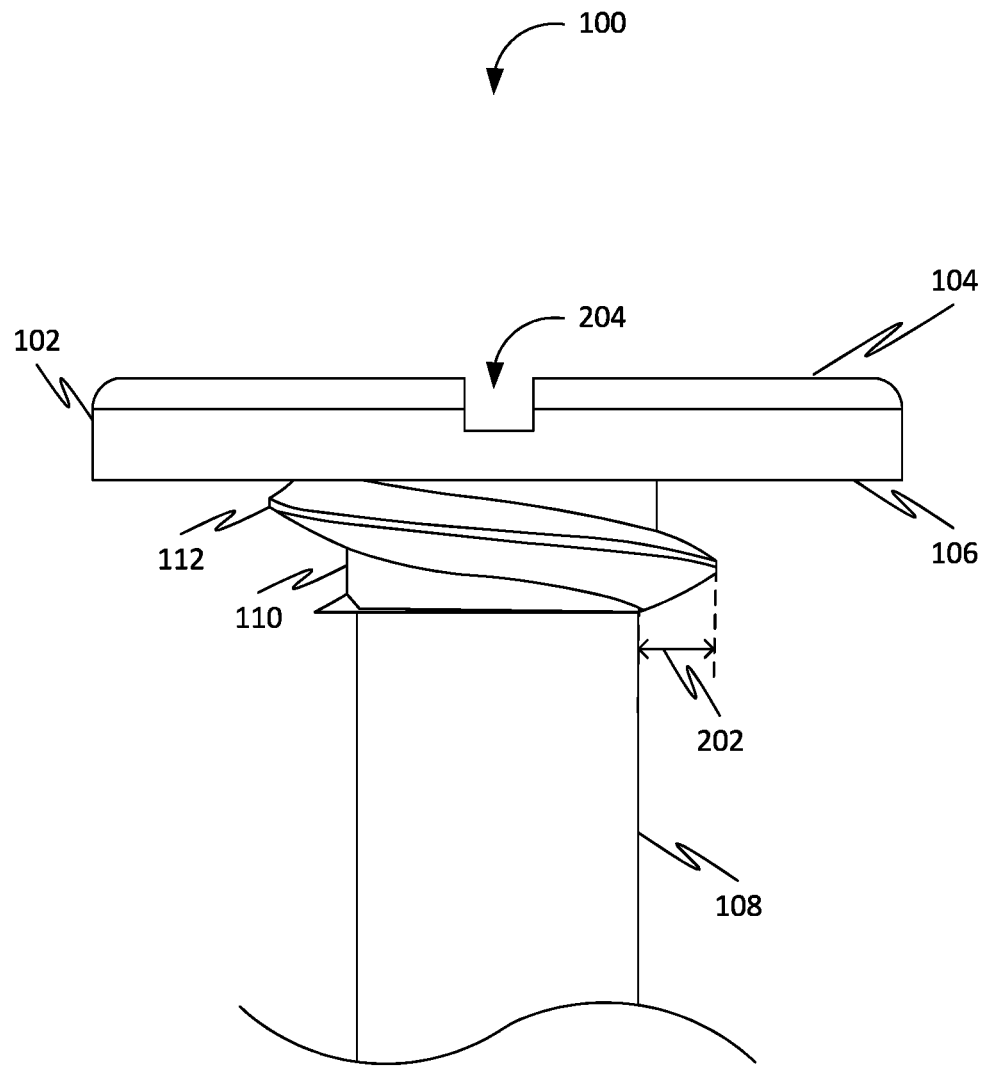
FIG. 2 is a partial view of the fastener, in accordance with some embodiments.

Further, in some embodiments, the at least one primary helical thread 112 may be characterized by a thread height 202 (as shown in FIG. 2). Further, the at least one primary helical thread 112 may include a first primary helical thread and a second primary helical thread. Further, the first primary helical thread may be associated with a first thread height of the thread height 202 and the second primary helical thread may be associated with a second thread height of the thread height 202. Further, the first thread height may be greater than the second thread height.

Further, in some embodiments, the at least one primary helical thread 112 may be characterized by a thread cross-sectional area. Further, the at least one primary helical thread 112 may include a first primary helical thread and a second primary helical thread. Further, the first primary helical thread may be associated with a first thread cross-sectional area of the thread cross-sectional area and the second primary helical thread may be associated with a second thread cross-sectional area of the thread cross-sectional area. Further, the first thread cross-sectional area may be greater than the second thread cross-sectional area.

Further, in some embodiments, the at least one primary helical thread 112 may be characterized by a thread helical angle. Further, the at least one primary helical thread 112 may include a first primary helical thread and a second primary helical thread. Further, the first primary helical thread may be associated with a first thread helical angle of the thread helical angle and the second primary helical thread may be associated with a second thread helical angle of the thread helical angle. Further, the first thread helical angle may be greater than the second thread helical angle.

Further, in some embodiments, the fastener head 102 may include at least one cavity 204 (as shown in FIG. 2) disposed on the top head surface 104. Further, the at least one cavity 204 configured for receiving an external member. Further, the at least one cavity 204 facilitates translation of at least one action from the external member to the fastener 100.

Figure 3:
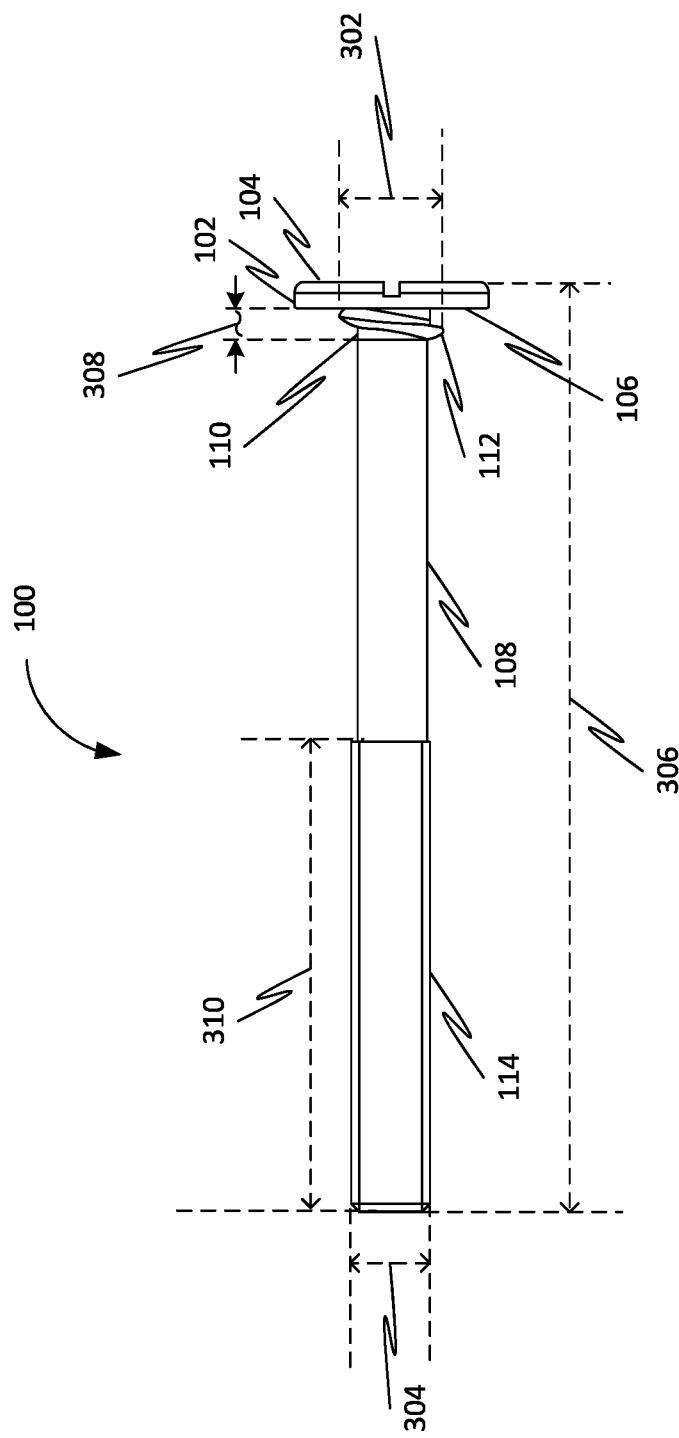
FIG. 3 is a side view of the fastener, in accordance with some embodiments.

Further, in some embodiments, the at least one primary helical thread 112 may be characterized by a primary outer helical diameter 302 (as shown in FIG. 3) and the at least one secondary helical thread 116 may be characterized by a secondary outer helical diameter 304 (as shown in FIG. 3). Further, the primary outer helical diameter 302 may be greater than the secondary outer helical diameter 304.

Further, in some embodiments, the at least one primary helical thread 112 may include an elongated thread body (not shown). Further, the elongated thread body may be attached helically to the first body portion 110. Further, a first end of the elongated thread body may be attached to a first portion end of the first body portion 110 and a second end of the elongated thread body may be attached to a second portion end of the first body portion 110.

Further, in some embodiments, the elongated thread body characterized by a thread cross-sectional area and a thread length. Further, the thread cross-sectional area may be associated with a thread area profile. Further, the thread cross-sectional area progressively decreases maintaining the thread area profile along the thread length from the first end to the second end.

Further, in some embodiments, the at least one primary helical thread 112 may be characterized by a thread pitch. Further, the thread pitch progressively decreases from the first portion end to the second portion end.

Further, in some embodiments, the at least one primary helical thread 112 may be characterized by a thread pitch. Further, the thread pitch progressively increases from the first portion end to the second portion end.

Further, in some embodiments, the fastener body 108 characterized by a fastener cross-sectional area and a fastener length 306 (as shown in FIG. 3). Further, the fastener length 306 may include a first portion length 308 (as shown in FIG. 3) associated with the first body portion 110 and a second portion length 310 (as shown in FIG. 3) associated with the second body portion 114. Further, the fastener cross-sectional area may include a first portion cross-sectional area of the first body portion 110 and a second portion cross-sectional area of the second body portion 114.

Further, in some embodiments, the first portion cross-sectional area progressively decreases along the first portion length 308. Further, the second portion cross-sectional area remains constant along the second portion length 310. Further, the second portion cross-sectional area may be less than the first portion cross-sectional area.

Further, in some embodiments, the first portion cross-sectional area remains constant along the first portion length 308. Further, the second portion cross-sectional area remains constant along the second portion length 310. Further, the second portion cross-sectional area may be equal to the first portion cross-sectional area.

Further, in some embodiments, the first portion cross-sectional area remains constant along the first portion length 308. Further, the second portion cross-sectional area remains constant along the second portion length 310. Further, the second portion cross-sectional area may be less than the first portion cross-sectional area.

FIG. 2 is a partial view of the fastener 100, in accordance with some embodiments.

FIG. 3 is a side view of the fastener 100, in accordance with some embodiments.

Figure 4:
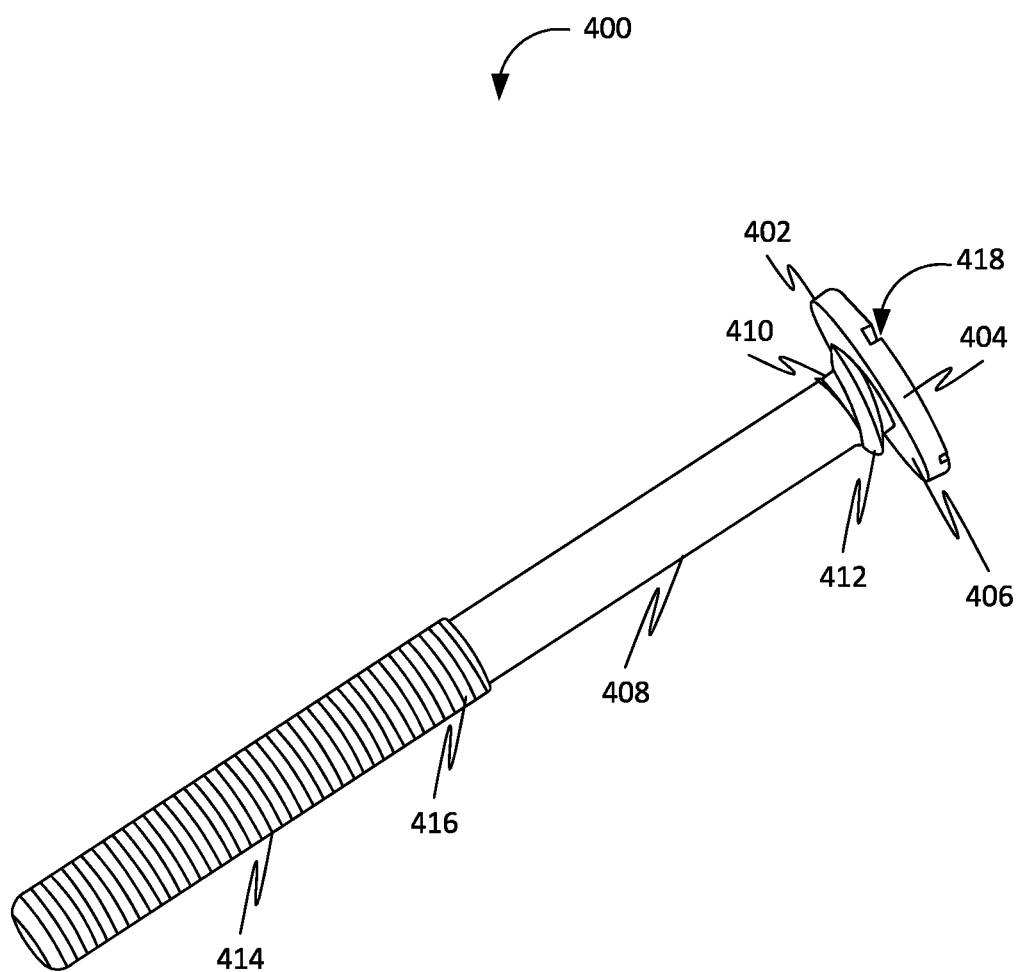
FIG. 4 is a fastener for preventing free spinning action during the fastening process, in accordance with some embodiments.

FIG. 4 is a fastener 400 for preventing free spinning action during the fastening process, in accordance with some embodiments. Accordingly, the fastener 400 may include a fastener head 402 and a fastener body 408.

Further, the fastener head 402 may include a top head surface 404 and a bottom head surface 406. Further, the fastener head 402 may include at least one cavity 418 disposed on the top head surface 404. Further, the at least one cavity 418 configured for receiving an external member. Further, the at least one cavity 418 facilitates translation of at least one action from the external member to the fastener 400. Further, the bottom head surface 406 may be characterized by a bottom surface area.

Further, the fastener body 408 attached to the fastener head 402. Further, a first body end of the fastener body 408 may be attached to the bottom head surface 406. Further, a first end cross-sectional area of the first body end may be less than the bottom surface area. Further, the fastener body 408 may include a first body portion 410 and a second body portion 414. Further, the first body portion 410 is proximal to the first body end. Further, the first body portion 410 may include at least one primary helical thread 412. Further, the at least one primary helical thread 412 may be associated with a primary handedness. Further, the second body portion 414 proximal to a second body end of the fastener body 408. Further, the second body portion 414 may include at least one secondary helical thread 416. Further, the at least one secondary helical thread 416 may be associated with a second handedness. Further, the secondary handedness may be reverse of the primary handedness.

Figure 5:
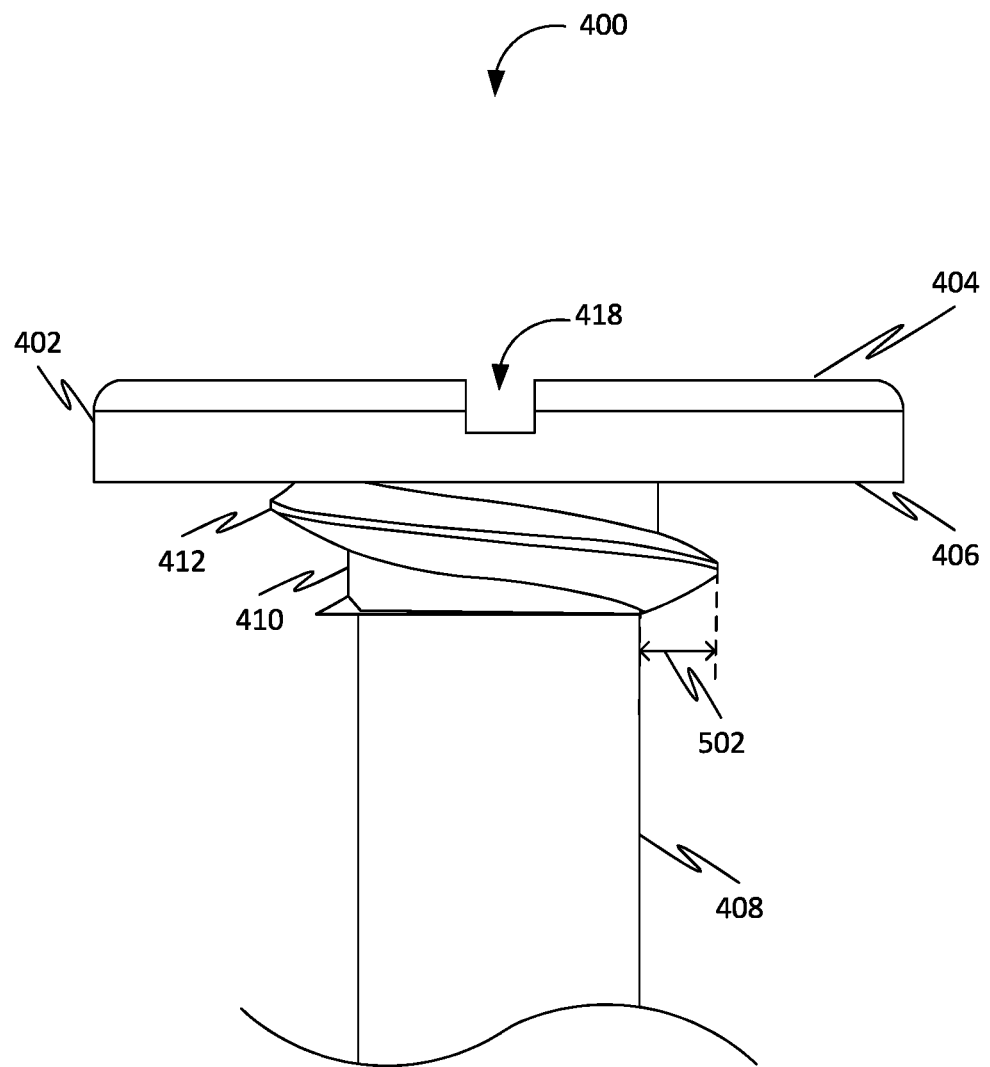
FIG. 5 is a partial view of the fastener, in accordance with some embodiments.

Further, in some embodiments, the at least one primary helical thread 412 may be characterized by a thread height 502 (as shown in FIG. 5). Further, the at least one primary helical thread 412 may include a first primary helical thread and a second primary helical thread. Further, the first primary helical thread may be associated with a first thread height of the thread height 502 and the second primary helical thread may be associated with a second thread height of the thread height 502. Further, the first thread height may be greater than the second thread height.

Further, in some embodiments, the at least one primary helical thread 412 may be characterized by a thread cross-sectional area. Further, the at least one primary helical thread 412 may include a first primary helical thread and a second primary helical thread. Further, the first primary helical thread may be associated with a first thread cross-sectional area of the thread cross-sectional area and the second primary helical thread may be associated with a second thread cross-sectional area of the thread cross-sectional area. Further, the first thread cross-sectional area may be greater than the second thread cross-sectional area.

Further, in some embodiments, the at least one primary helical thread 412 may be characterized by a thread helical angle. Further, the at least one primary helical thread 412 may include a first primary helical thread and a second primary helical thread. Further, the first primary helical thread may be associated with a first thread helical angle of the thread helical angle and the second primary helical thread may be associated with a second thread helical angle of the thread helical angle. Further, the first thread helical angle may be greater than the second thread helical angle.

Further, in some embodiments, the at least one primary helical thread 412 may include an elongated thread body. Further, the elongated thread body may be attached helically to the first body portion 410. Further, a first end of the elongated thread body may be attached to a first portion end of the first body portion 410 and a second end of the elongated thread body may be attached to a second portion end of the first body portion 410.

Further, in some embodiments, the elongated thread body characterized by a thread cross-sectional area and a thread length. Further, the thread cross-sectional area may be associated with a thread area profile. Further, the thread cross-sectional area progressively decreases maintaining the thread area profile along the thread length from the first end to the second end.

FIG. 5 is a partial view of the fastener 400, in accordance with some embodiments.

Figure 6:
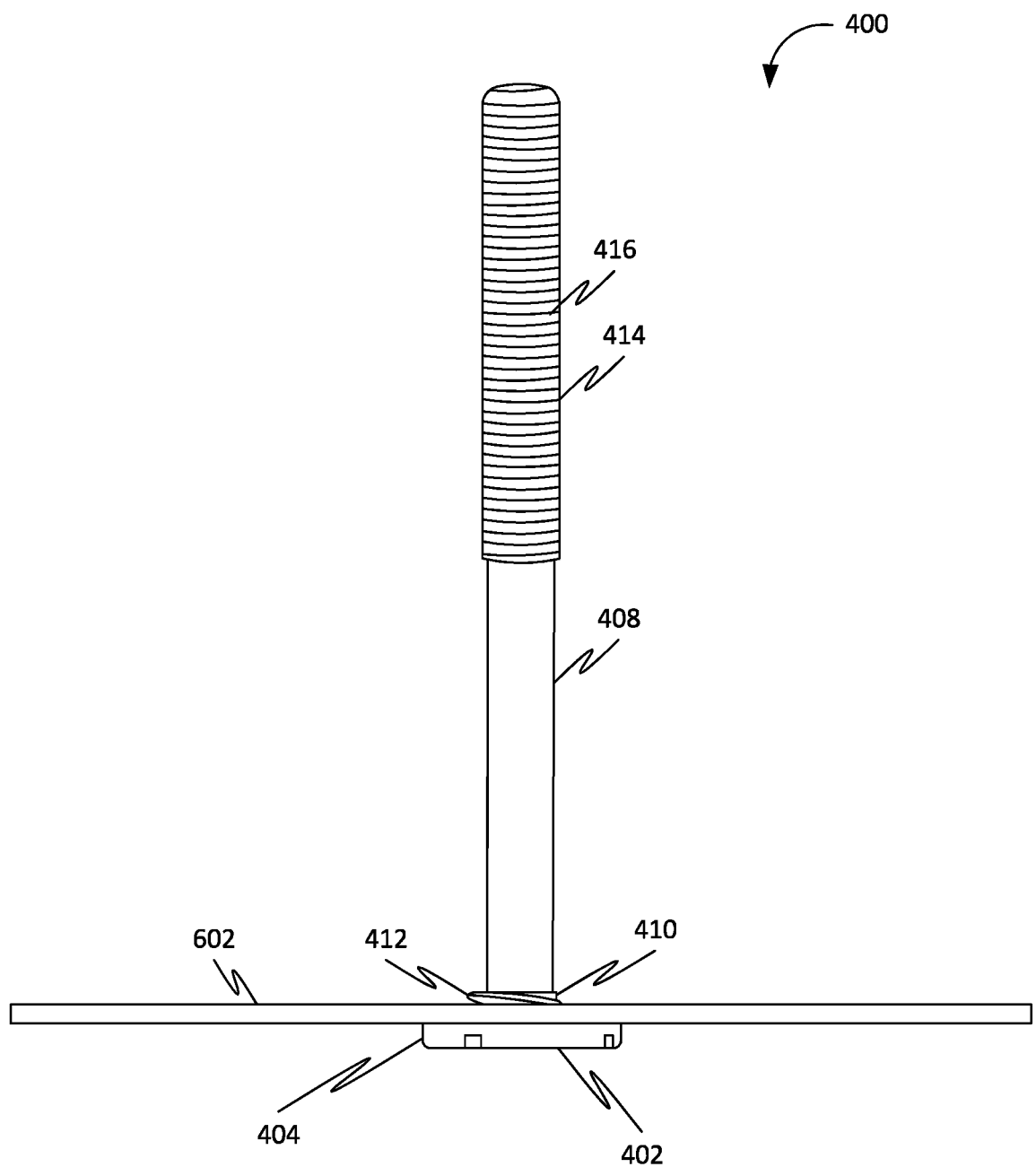
FIG. 6 is a side view of the fastener fastened in a substance, in accordance with some embodiments.

FIG. 6 is a side view of the fastener 400 fastened in a substance 602, in accordance with some embodiments.

Figure 7:
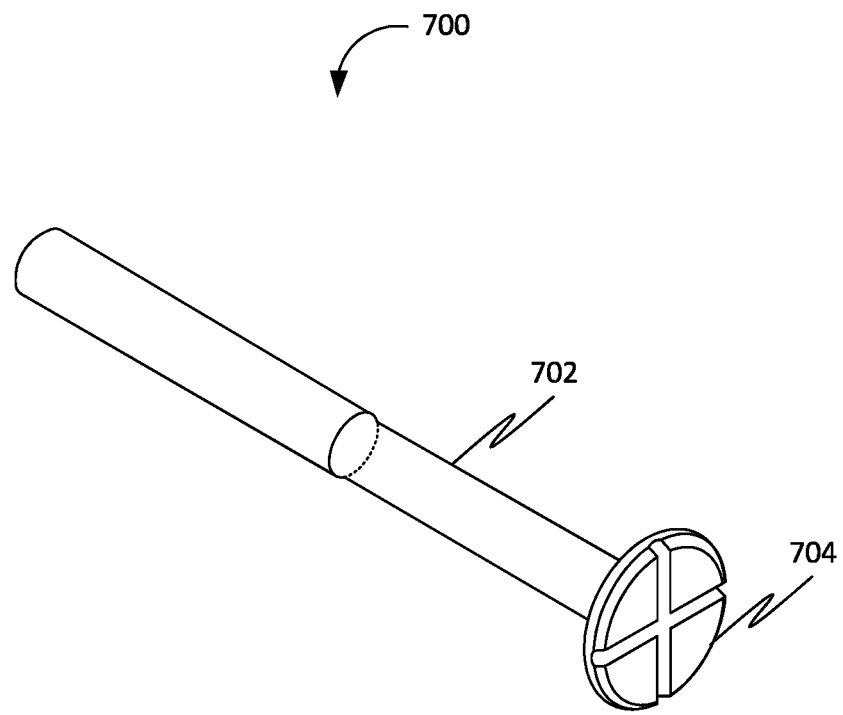
FIG. 7 is a perspective view of a turnlock bolt, in accordance with some embodiments.

FIG. 7 is a perspective view of a turnlock bolt 700, in accordance with some embodiments. Accordingly, the turnlock bolt 700 may include an 8 mm flat head turnlock bolt fastener. Further, the turnlock bolt 700 may include a fastener body 702 and a fastener head 704.

Figure 8:
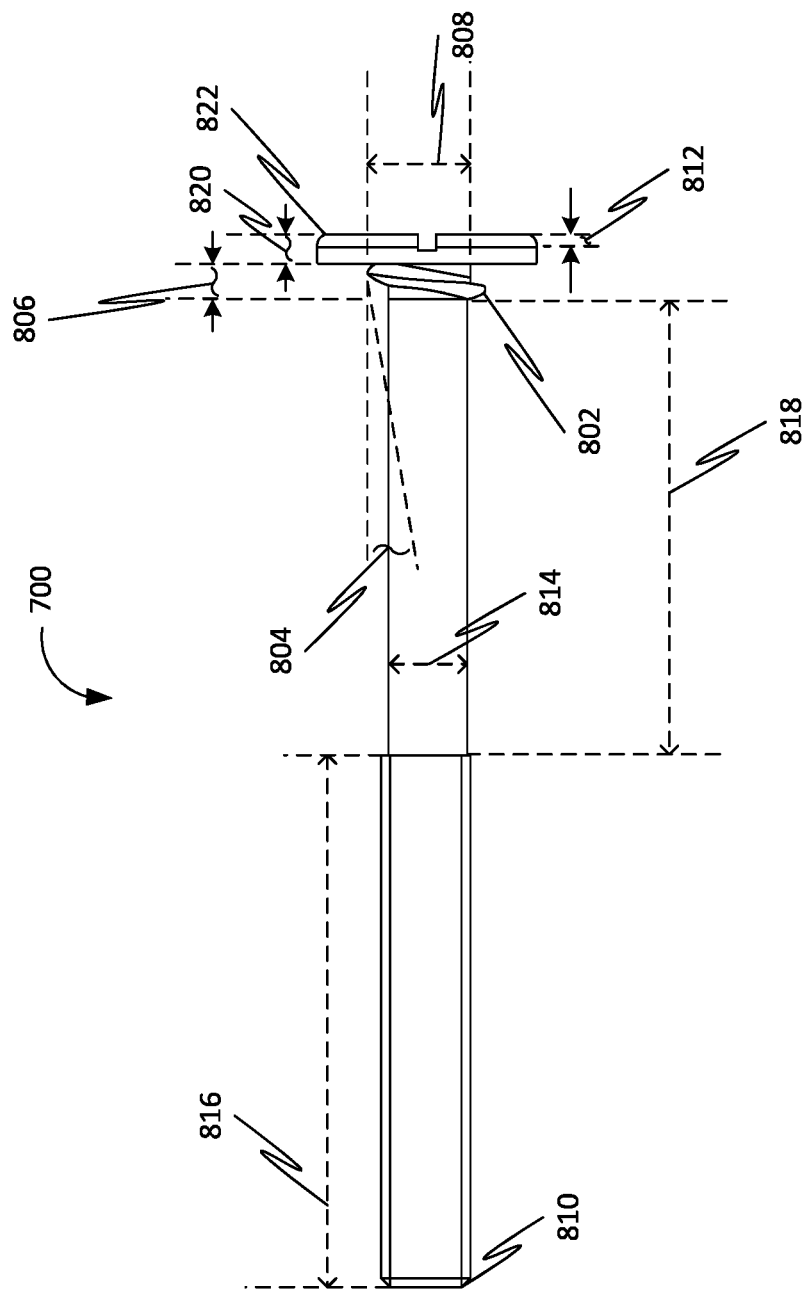
FIG. 8 is a side view of the turnlock bolt, in accordance with some embodiments.

FIG. 8 is a side view of the turnlock bolt 700, in accordance with some embodiments. Accordingly, the turnlock 700 may be associated with M8×1.25 machine threads (or any machine thread standard, metric, etc.). Further, the turnlock bolt 700 may include a reverse locking thread 802. Further, a length 806 associated with the turnlock bolt 700 may be 0.125 inches. Further, an angle 804 associated with the turnlock bolt 700 may be 8.56°. Further, a diameter 808 associated with the turnlock bolt 700 may be 0.450 inches. Further, the fastener body 702 may be chamfered by 0.030 inches×40° at the fastener end 810. Further, a diameter 814 associated with the turnlock bolt 700 may be 0.275 inches. Further, a length 816 associated with the turnlock bolt 700 may be 1.900 inches. Further, a length 818 associated with the turnlock bolt 700 may be 1.625 inches. Further, a length 820 associated with the fastener head 704 may be 0.100 inches. Further, a radius 822 associated with the fastener head 704 may be 0.030 inches. Further, a length 812 associated with the fastener head 704 may be 0.050 inches.

Figure 9:
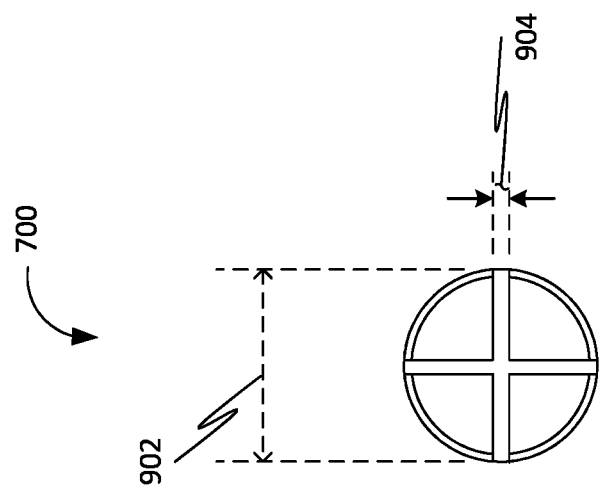
FIG. 9 is a top view of the turnlock bolt, in accordance with some embodiments.

FIG. 9 is a top view of the turnlock bolt 700, in accordance with some embodiments. Accordingly, a diameter 902 associated with the fastener head 704 may be 0.788 inches. Further, a width 904 associated with the fastener head 704 may be 0.60 inches.

Figure 10:
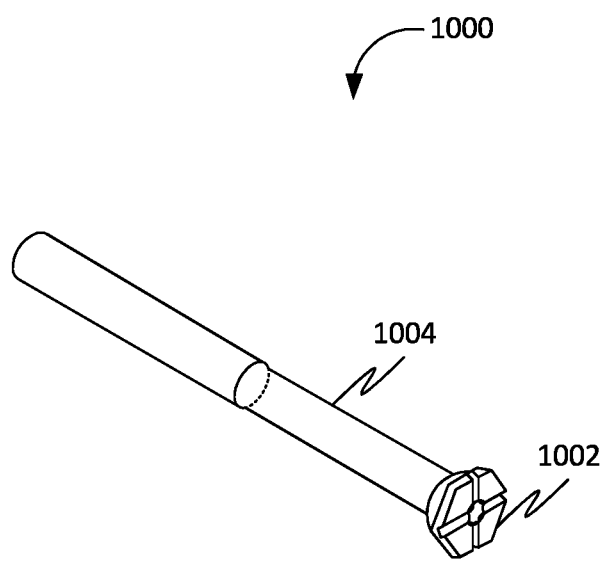
FIG. 10 is a perspective view of a turnlock bolt, in accordance with some embodiments.

FIG. 10 is a perspective view of a turnlock bolt 1000, in accordance with some embodiments. Accordingly, the turnlock bolt 1000 may include an 8 mm hex head turnlock bolt. Further, the turnlock bolt 1000 may include a fastener head 1002 and a fastener body 1004.

Figure 11:
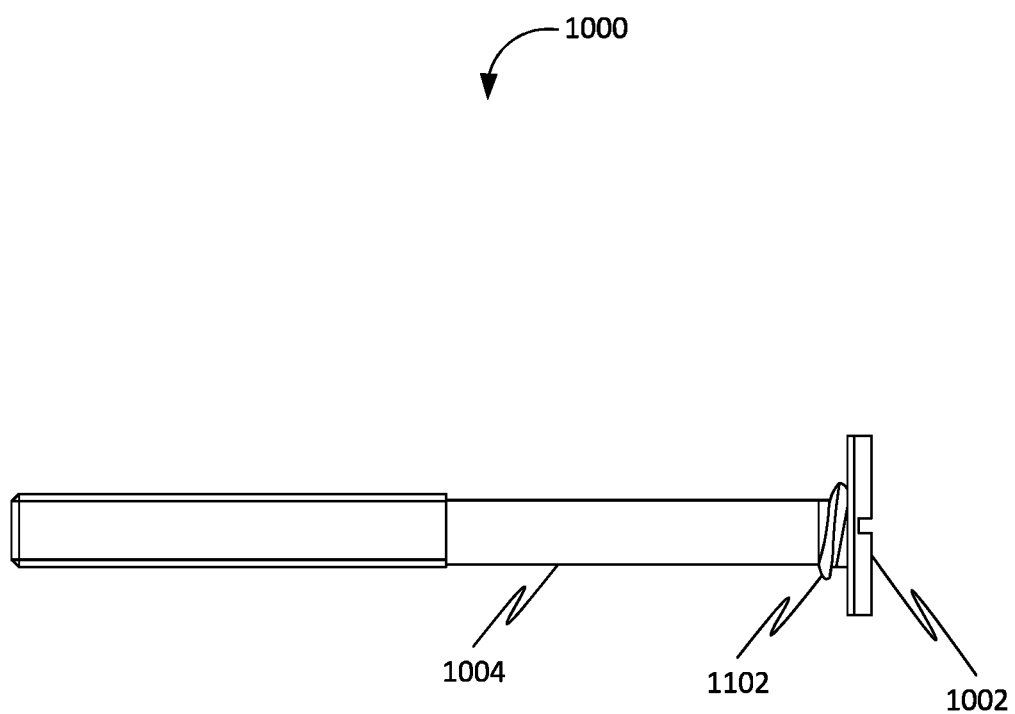
FIG. 11 is a side view of the turnlock bolt, in accordance with some embodiments.

FIG. 11 is a side view of the turnlock bolt 1000, in accordance with some embodiments. Accordingly, the turnlock bolt 1000 may be associated with M8×1.25 machine threads (or any machine thread standard, metric, etc.). Further, the turnlock bolt 1000 may include a locking screw thread 1102.

Figure 12:
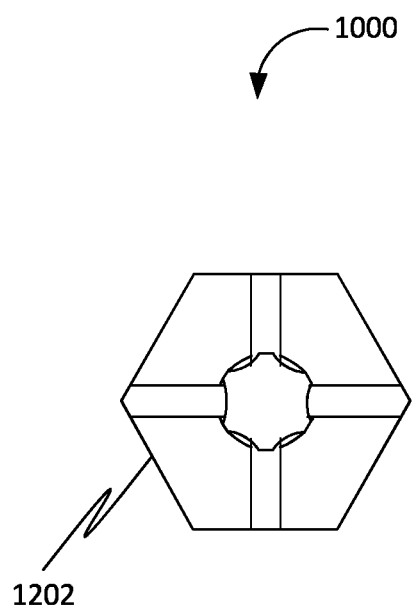
FIG. 12 is a top view of the turnlock bolt, in accordance with some embodiments.

FIG. 12 is a top view of the turnlock bolt 1000, in accordance with some embodiments. Accordingly, the turnlock bolt 1000 may include a hex head 1202 with torx drive.

Figure 13:
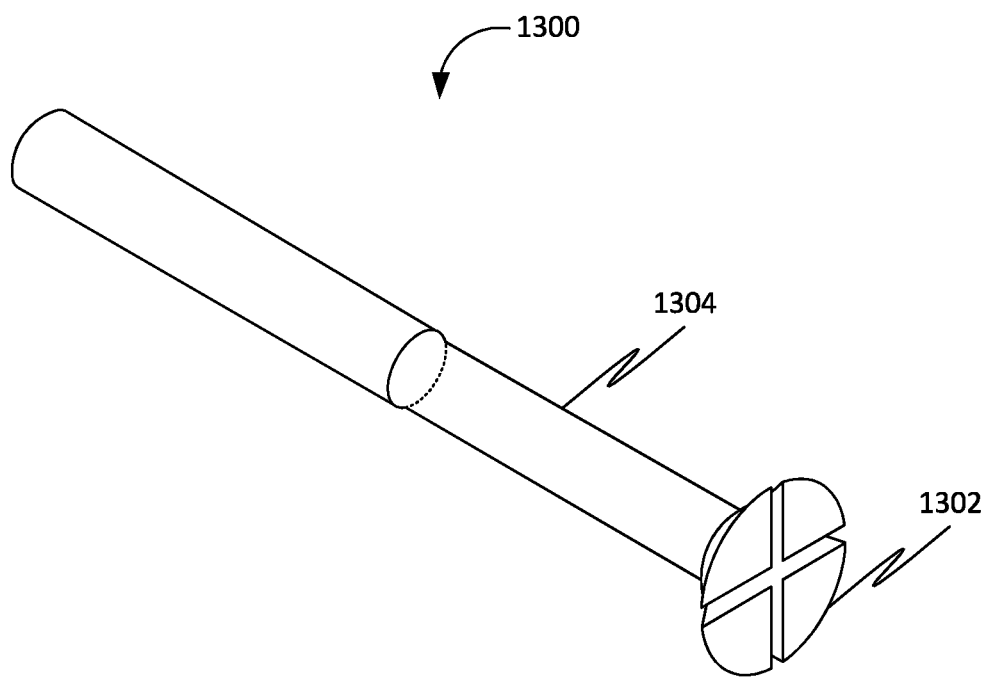
FIG. 13 is a perspective view of a turnlock bolt, in accordance with some embodiments.

FIG. 13 is a perspective view of a turnlock bolt 1300, in accordance with some embodiments. Accordingly, the turnlock bolt 1300 may include an 8 mm hex head turnlock bolt. Accordingly, the turnlock bolt 1300 may include a fastener head 1302 and a fastener body 1304.

Figure 14:
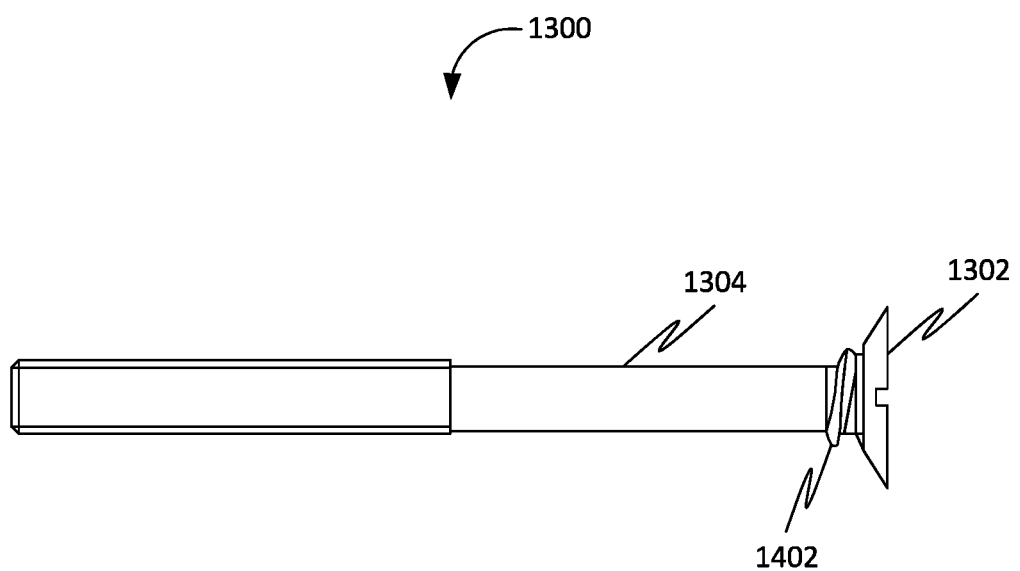
FIG. 14 is a side view of the turnlock bolt, in accordance with some embodiments.

FIG. 14 is a side view of the turnlock bolt 1300, in accordance with some embodiments. Accordingly, the turnlock bolt 1300 may be associated with M8×1.25 machine threads (or any machine thread standard, metric, etc.). Further, the turnlock bolt 1300 may include a locking screw thread 1402.

Figure 15:
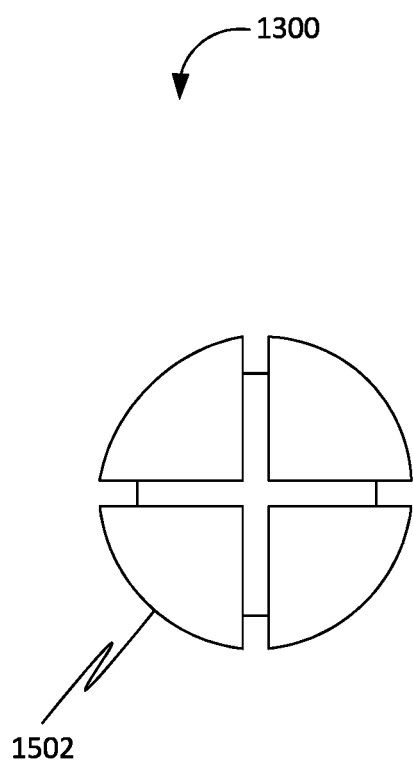
FIG. 15 is a top view of the turnlock bolt, in accordance with some embodiments.

FIG. 15 is a top view of the turnlock bolt 1300, in accordance with some embodiments. Accordingly, the turnlock bolt 1300 may include a 120° countersunk head 1502.

Although the present disclosure has been explained in relation to its preferred embodiment, it is to be understood that many other possible modifications and variations can be made without departing from the spirit and scope of the disclosure.

The following is claimed:

1. A fastener for preventing free spinning action during the fastening process, the fastener comprising:
   a fastener head comprising a top head surface and a bottom head surface, wherein the bottom head surface is characterized by a bottom surface area; and
   a fastener body attached to the fastener head, wherein a first body end of the fastener body is attached to the bottom head surface, wherein a first end cross-sectional area of the first body end is less than the bottom surface area, wherein the fastener body comprising:
      a first body portion proximal to the first body end, wherein the first body portion comprises at least one primary helical thread, wherein the at least one primary helical thread is associated with a primary handedness;
      a second body portion proximal to a second body end of the fastener body, wherein the second body portion comprises at least one secondary helical thread, wherein the at least one secondary helical thread is associated with a second handedness, wherein the secondary handedness is reverse of the primary handedness; and
      wherein the at least one primary helical thread is characterized by a thread helical angle, wherein the at least one primary helical thread comprises a first primary helical thread and a second primary helical thread, wherein the first primary helical thread is associated with a first thread helical angle of the thread helical angle and the second primary helical thread is associated with a second thread helical angle of the thread helical angle, wherein the first thread helical angle is greater than the second thread helical angle.

2. The fastener of claim 1, wherein the at least one primary helical thread is characterized by a thread height, wherein the at least one primary helical thread comprises a first primary helical thread and a second primary helical thread, wherein the first primary helical thread is associated with a first thread height of the thread height and the second primary helical thread is associated with a second thread height of the thread height, wherein the first thread height is greater than the second thread height.

3. The fastener of claim 1, wherein the at least one primary helical thread is characterized by a thread cross-sectional area, wherein the at least one primary helical thread comprises a first primary helical thread and a second primary helical thread, wherein the first primary helical thread is associated with a first thread cross-sectional area of the thread cross-sectional area and the second primary helical thread is associated with a second thread cross-sectional area of the thread cross-sectional area, wherein the first thread cross-sectional area is greater than the second thread cross sectional area.

4. The fastener of claim 1, wherein the fastener head comprises at least one cavity disposed on the top head surface, wherein the at least one cavity configured for receiving an external member, wherein the at least one cavity facilitates translation of at least one action from the external member to the fastener.

5. The fastener of claim 1, wherein the at least one primary helical thread is characterized by a primary outer helical diameter and the at least one secondary helical thread is characterized by a secondary outer helical diameter, wherein the primary outer helical diameter is greater than the secondary outer helical diameter.

6. The fastener of claim 1, wherein the at least one primary helical thread comprises an elongated thread body, wherein the elongated thread body is attached helically to the first body portion, wherein a first end of the elongated thread body is attached to a first portion end of the first body portion and a second end of the elongated thread body is attached to a second portion end of the first body portion.

7. The fastener of claim 6, wherein the elongated thread body characterized by a thread cross-sectional area and a thread length, wherein the thread cross-sectional area is associated with a thread area profile, wherein the thread cross-sectional area progressively decreases maintaining the thread area profile along the thread length from the first end to the second end.

8. The fastener of claim 1, wherein the fastener body characterized by a fastener cross-sectional area and a fastener length, wherein the fastener length comprises a first portion length associated with the first body portion and a second portion length associated with the second body portion, wherein the fastener cross-sectional area comprises a first portion cross-sectional area of the first body portion and a second portion cross-sectional area of the second body portion.

9. The fastener of claim 8, wherein the first portion cross-sectional area progressively decreases along the first portion length, wherein the second portion cross-sectional area remains constant along the second portion length, wherein the second portion cross-sectional area is less than the first portion cross-sectional area.

10. The fastener of claim 8, wherein the first portion cross-sectional area remains constant along the first portion length, wherein the second portion cross-sectional area remains constant along the second portion length, wherein the second portion cross-sectional area is equal to the first portion cross-sectional area.

11. The fastener of claim 8, wherein the first portion cross-sectional area remains constant along the first portion length, wherein the second portion cross-sectional area remains constant along the second portion length, wherein the second portion cross-sectional area is less than the first portion cross-sectional area.

12. A fastener for preventing free spinning action during the fastening process, the fastener comprising:
   a fastener head comprising a top head surface and a bottom head surface, wherein the fastener head comprises at least one cavity disposed on the top head surface, wherein the at least one cavity configured for receiving an external member, wherein the at least one cavity facilitates translation of at least one action from the external member to the fastener, wherein the bottom head surface is characterized by a bottom surface area; and a fastener body attached to the fastener head, wherein a first body end of the fastener body is attached to the bottom head surface, wherein a first end cross-sectional area of the first body end is less than the bottom surface area, wherein the fastener body comprising:
  a first body portion proximal to the first body end, wherein the first body portion comprises at least one primary helical thread, wherein the at least one primary helical thread is associated with a primary handedness;
  a second body portion proximal to a second body end of the fastener body, wherein the second body portion comprises at least one secondary helical thread, wherein the at least one secondary helical thread is associated with a second handedness, wherein the secondary handedness is reverse of the primary handedness; and
  wherein the at least one primary helical thread is characterized by a thread helical angle, wherein the at least one primary helical thread comprises a first primary helical thread and a second primary helical thread, wherein the first primary helical thread is associated with a first thread helical angle of the thread helical angle and the second primary helical thread is associated with a second thread helical angle of the thread helical angle, wherein the first thread helical angle is greater than the second thread helical angle.

13. The fastener of claim 12, wherein the at least one primary helical thread is characterized by a thread height, wherein the at least one primary helical thread comprises a first primary helical thread and a second primary helical thread, wherein the first primary helical thread is associated with a first thread height of the thread height and the second primary helical thread is associated with a second thread height of the thread height, wherein the first thread height is greater than the second thread height.

14. The fastener of claim 12, wherein the at least one primary helical thread is characterized by a thread cross-sectional area, wherein the at least one primary helical thread comprises a first primary helical thread and a second primary helical thread, wherein the first primary helical thread is associated with a first thread cross-sectional area of the thread cross-sectional area and the second primary helical thread is associated with a second thread cross-sectional area of the thread cross-sectional area, wherein the first thread cross-sectional area is greater than the second thread cross-sectional area.

15. The fastener of claim 12, wherein the at least one primary helical thread comprises an elongated thread body, wherein the elongated thread body is attached helically to the first body portion, wherein a first end of the elongated thread body is attached to a first portion end of the first body portion and a second end of the elongated thread body is attached to a second portion end of the first body portion.

16. The fastener of claim 15, wherein the elongated thread body characterized by a thread cross-sectional area and a thread length, wherein the thread cross-sectional area is associated with a thread area profile, wherein the thread cross-sectional area progressively decreases maintaining the thread area profile along the thread length from the first end to the second end.

17. A fastener for preventing free spinning action during the fastening process, the fastener comprising:
  a fastener head comprising a top head surface and a bottom head surface, wherein the bottom head surface is characterized by a bottom surface area; and
  a fastener body attached to the fastener head, wherein a first body end of the fastener body is attached to the bottom head surface, wherein a first end cross-sectional area of the first body end is less than the bottom surface area, wherein the fastener body comprising:
    a first body portion proximal to the first body end, wherein the first body portion comprises at least one primary helical thread, wherein the at least one primary helical thread is associated with a primary handedness;
    a second body portion proximal to a second body end of the fastener body, wherein the second body portion comprises at least one secondary helical thread, wherein the at least one secondary helical thread is associated with a second handedness, wherein the secondary handedness is reverse of the primary handedness; and
    wherein the at least one primary helical thread is characterized by a thread pitch, wherein the thread pitch progressively decreases from the first portion end to the second portion end.

18. A fastener for preventing free spinning action during the fastening process, the fastener comprising:
  a fastener head comprising a top head surface and a bottom head surface, wherein the bottom head surface is characterized by a bottom surface area; and
  a fastener body attached to the fastener head, wherein a first body end of the fastener body is attached to the bottom head surface, wherein a first end cross-sectional area of the first body end is less than the bottom surface area, wherein the fastener body comprising:
    a first body portion proximal to the first body end, wherein the first body portion comprises at least one primary helical thread, wherein the at least one primary helical thread is associated with a primary handedness;
    a second body portion proximal to a second body end of the fastener body, wherein the second body portion comprises at least one secondary helical thread, wherein the at least one secondary helical thread is associated with a second handedness, wherein the secondary handedness is reverse of the primary handedness; and
    wherein the at least one primary helical thread is characterized by a thread pitch, wherein the thread pitch progressively increases from the first portion end to the second portion end.

* * * * *